United States Patent Office 3,567,797
Patented Mar. 2, 1971

3,567,797
CURABLE COMPOSITIONS COMPRISING (A) A BIS(1,2 - EPOXYALKYL)CYCLOALIPHATIC COMPOUND, (B) A POLYETHER POLYEPOXIDE AND (C) A CURING AGENT
Frank D. Mango, Oakland, and Herbert A. Newey, Lafayette, Calif., assignors to Shell Oil Company, New York, N.Y.
No Drawing. Continuation-in-part of application Ser. No. 700,041, Jan. 24, 1968. This application Dec. 9, 1968, Ser. No. 782,445
Int. Cl. C08g 30/14, 45/00
U.S. Cl. 260—830         8 Claims

ABSTRACT OF THE DISCLOSURE

Polymer compositions having improved physical properties are obtained by mixing a bis(1,2-epoxyalkyl)cycloaliphatic compound having at least 5 carbon atoms in the carbocyclic ring thereof with a polyether polyepoxide possessing more than one vic-epoxy group. The mixture may be cured through the use of conventional curing agents to produce polymeric compositions which are useful in the preparation of surface compositions, castings, and impregnating and sealing compositions.

This application is a continuation-in-part application of application Ser. No. 700,041, filed Jan. 24, 1968, now U.S. 3,476,693, issued Nov. 4, 1969.

This invention relates to new epoxy resin compositions. More particularly, the invention relates to epoxy resin compositions having improved fluidity which can be cured to form products having improved physical properties.

Specifically, the invention provides new epoxy resin compositions having low viscosities and can be cured to form products having excellent resistance to deformation at high temperatures and excellent resistance to water. The new compositions comprising a mixture of (1) a polyether polyepoxide possessing more than one vic-epoxy group, and preferably a glycidyl ether of a polyhydric phenol, and (2) a bis(1,2-epoxyalkyl)cycloaliphatic compound having at least 5 carbon atoms in the carbocyclic ring thereof. The invention further provides valuable cured products obtained by reacting the aforementioned compositions with epoxy curing agents, such as, for example, polyamines, polycarboxylic acid and anhydrides and metal salts.

Polyepoxides, such as, for example, those obtained by reacting epichlorohydrin with polyhydric phenols in the presence of caustic, are promising materials for use in preparing industrial products as they may be cured to resins which are very hard and durable and have good resistance to chemicals. The resins, however, have certain undesirable characteristics which have placed a limitation on their industrial applications. These materials, for example, are generally thick liquids or solids and are difficult to utilize in that form for many applications, such as in the preparation of surfacing compositions, castings, impregnating and sealing compositions and the like. It has been proposed to correct this defect by combining the resins with fluid inert diluents, such as dibutyl phthalate, or reactive diluents, such as the mono-epoxy compounds as butyl glycidyl ether. While this type of addition improves the fluidity, it has been found that the resulting cured products have lost many of the desired properties of the initial resin, such as high heat distortion temperatures, good water resistance and good flexural strength.

It is, therefore, an object of the invention to provide new epoxy resin compositions. It is a further objective to provide new epoxy resin compositions which have improved fluidity. It is a further object to provide new epoxy resin compositions having viscosities of the order of 5 to 15 poises at 25° C. It is a further object to provide new epoxy resin compositions that can be cured to form products having excellent resistance to deformation at high temperatures. It is a further object to provide new compositions that can be cured to form products having good resistance to water. It is a further object to provide new epoxy resin compositions that can be cured in a very short period. It is a further object to provide cured epoxy resins having improved physical properties. Other objects and advantages of the invention will be apparent from the following detailed description thereof.

It has now been discovered that these and other objects can be accomplished by the compositions of the invention comprising a mixture of (1) a polyether polyepoxide possessing more than one vic-epoxy group, and preferably a glycidyl polyether of a polyhydric phenol, and (2) a bis(1,2-epoxyalkyl)cycloaliphatic compound having at least 5 carbon atoms in the carbocyclic ring thereof. The said epoxy ester being present in an amount of at least 1 part per 100 parts of the polyether polyepoxide. It has been found that these new compositions have surprisingly low viscosities, such as, for example, the order of 1 to 80 poises at 25° C., and can be easily poured and otherwise handled as fluid liquids. In addition, the new compositions cure readily when contacted with conventional epoxy resin curing agents to form hard insoluble infusible products having surprisingly good physical properties. The new cured products, for example, have excellent heat distortion points and improved water resistance. Evidence of these superior properties may be found in the working examples at the end of the specification.

One of the components in the new compositions of the invention comprise certain bis(1,2-epoxyalkyl)cycloaliphatic compounds having at least 5 carbon atoms in the carbocyclic ring thereof. These compounds are fully described in copending application Ser. No. 700,041, now U.S. 3,476,693, issued Nov. 4, 1969. Broadly speaking, any bis(1,2-epoxyalkyl)cycloaliphatic hydrocarbon having at least 5 carbon atoms in the ring thereof provides cured polymer compositions with improved physical properties. One class of suitable bis((1,2-epoxyalkyl)cycloaliphatic compounds is represented by the Formula I

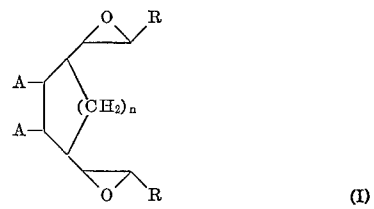

(I)

wherein R independently is hydrogen or methyl, n is a whole number from 1 to 2, inclusive, and the A's taken singly are each hydrogen or taken together form a divalent oxy linkage which together with the adjacent carbon atoms to which said oxy linkage is attached forms an oxirane ring. Illustrative compounds represented by Formula I wherein both A groups are hydrogen are 1,3-bis (1,2-epoxyethyl)cyclopentane, 1,3-bis(1,2 - epoxypropyl) cyclopentane, 1 - (1,2 - epoxyethyl)-3-(1,2-epoxypropyl) cyclopentane, 1,4 - bis(1,2 - epoxyethyl)cyclohexane, 1,4-bis(1,2 - epoxypropyl)cyclohexane and 1 - (1,2-epoxyethyl)-3-(1,2-epoxypropyl)cyclohexane. The compounds represented by Formula I wherein both A groups together form an oxy linkage are illustrated by 3,5-bis(1,2-epoxyethyl)cyclopentene - 1,2 - oxide, 3,5 - bis(1,2-epoxypropyl)cyclopentene - 1,2 - oxide, 3-(1,2-epoxyethyl)-5-(1,2-epoxypropyl)cyclopentene-1,2-oxide, 3,6 - bis(1,2 - epoxyethyl)cyclohexene - 1,2 - oxide, 3,6 - bis(1,2-epoxypropyl-cyclohexene-1,2 - oxide and 3 - (1,2-epoxyethyl)-6-(1,2- epoxypropyl)cyclohexene-1,2-oxide. Particularly preferred epoxide monomers are those represented by Formula I wherein both A groups are hydrogen, i.e., bis(1,2-epoxyalkyl)cyclopentane and bis(1,2 - epoxyalkyl)cyclohexane compounds, especially 1,3 - bis(1,2-epoxyethyl)cyclopentane.

The epoxides represented by Formula I are prepared by reacting the corresponding ethylenically unsaturated compounds with an epoxidizing agent. Organic peracids, such as peracetic acid, perbenzoic acid, monoperphthalic acid and the like, are preferred agents for the epoxidation. Conventional procedures for epoxidizing ethylenically unsaturated compounds with organic peracids are disclosed by Swern, Org. Reactions, vol. VII, page 378 (1953).

The amount of the epoxidizing agent employed depends upon the number of ethylenic linkages to be epoxidized. In general, at least one mole of the epoxidizing agent is employed for every ethylenic linkage to be epoxidized. It is preferred to carry out the epoxidation in a suitable mutual solvent for the reactants and product. Methylene chloride is an especially useful solvent for this purpose, but other materials such as ethyl ether, chloroform, benzene, ethyl acetate, and the like, are also useful. It is generally desirable to maintain the epoxidation temperature between about —20° C. and about 60° C., and more preferably, between 10° C. and 40° C. Atmospheric, superatmospheric or subatmospheric pressures are employed as desired.

The epoxidized products obtained by this method are removed and separated from the reaction mixture by any conventional means, such as distillation, extraction, fractional precipitation, and the like.

The polyether polyepoxides to be used in preparing the compositions of the present invention include those compounds possessing at least two ether linkages (i.e., —O— linkages) and a plurality of 1,2-epoxy groups (i.e.,

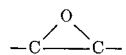

groups). These polyether polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyether polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyether polyepoxide material consists of a single compound and all of the epoxy groups are intact, the epoxy equivalency will be integers, such as 2, 3, 4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Polyether polyepoxides to be used in the process of the invention may be exemplified by 1,4-bis(2,3-epoxypropoxy)benzene, 1,3-bis(2,3-epoxypropoxy)benzene, 4,4'-bis(2,3-epoxyproxy)diphenyl ether, 1,4-bis(2,3-epoxypropoxy)oxtane, 1,4-bis(2,3-epoxypropoxy)cyclohexane, 4,4'-bis(2 - hydroxy-3,4-epoxybutoxy)diphenyldimethylmethane, 1,3-bis(4,5 - epoxypentoxy)-5-chlorobenzene, 1,4-bis (3,4-epoxybutoxy)-2-chlorocyclohexane, diglycidyl ether, ethylene glycol diglycidyl ether, resorcinol diglycidyl ether, and 1,2,3,4-tetra(2-hydroxy-3,4-epoxybutoxy)butane.

Other examples include the glycidyl polyether of polyhydric phenols obtained by reacting a polyhydric phenol with an excess, e.g., 4 to 8 mol excess, of a chlorohydrin, such as epichlorohydrin and dichlorohydrin. Thus, polyether B described hereinafter, which is substantially 2,2-bis(2,3-epoxypropoxyphenyl)propane, is obtained by reacting bis-phenol(2,2-bis(hydroxyphenyl)propane) with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxyphenol)butane, 4,4'-dihydroxybenzophenone, bis(4-hydroxyphenyl)ethane, and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene, glycol, ethylene glycol, diethylene glycol, butylene glycol, hexanetriol, sorbitol, mannitol, pentanetroil, pentaerythritol, di- and tripentaerythritol, polyglycerol, culcitol, inositol, carbohydrates, methyltrimethylolpropane, 2,6-octanedoil, 1,2,4,5-tetrahydroxycyclohexane, 2-ethylhexanetroil-1,2,6, glycerol methyl ether, glycerol allyl ether, polyvinyl alcohol and polyallyl alcohol and mixtures thereof.

Other polyether polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyether polyepoxides comprises the hydroxy-substituted polyepoxy polyethers obtained by reacting, preferably in an alkaline medium, a slight excess, e.g., 0.5 to 3 mol excess, of a halogen-containing epoxide, such as epichlorohydrin, with any of the aforedescribed polyhydric phenols, such as resorcinol, catechol, 2,2-bis(4' - hydroxyphenyl)-propane, bis(4-(2'-hydroxynaphth-1-yl)2,2-hydroxynaphth-1-yl)methane and the like.

Other polymeric polyether polyepoxides include the polymers and copolymers of the allylic ether of epoxy-containing alcohols. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl ether-styrene copolymer, methallyl 3,4-epoxybutyl ether-allyl benzoate copolymer, poly(vinyl 2,3-epoxypropyl)ether and an allyl glycidyl ether-vinyl acetate copolymer.

Preferred polyether polyepoxides comprise the members of the group consisting of diglycidyl ether, monomeric alpihatic polyepoxides containing a plurality of glycidyl radicals joined through oxygen ether linkages to aliphatic hydrocarbon radicals, monomeric aromatic polyepoxides containing a plurality of glycidyl radicals joined through oxygen ether linkages to mononuclear or polynuclear aromatic radicals, the polyepoxy-containing reaction product of an aliphatic polyhydric alcohol and epichlorohydrin, the polyepoxy-containing polymeric reaction product of an aromatic polyhydric phenol and epichlorohydrin, the polyepoxy-containing reaction product of an aliphatic polyhydric alcohol and a polyepoxide compound, the polyepoxy-containing reaction product of a polyhydric phenol and a polyhydric phenol and a polyepoxide compound, the homo- and copolymers of allylic ethers of epoxy-substituted alcohols prepared in the absence of alkaline or acidic catalysts, and copolymers of the aforedescribed epoxy-containing monomers and at least one monomer containing a $CH_2=C=$ group prepared in the absence of alkaline or acidic catalyst.

Preferred polyether polyepoxides include the monomeric and polymeric glycidyl ether of dihydric phenols obtained by reacting epichlorohydrin with a dihydric phenol in an alkaline medium. The monomeric products of this type may be represented by the general formula

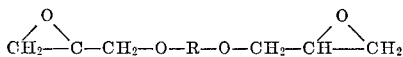

wherein R represents a divalent hydrocarbon radical of the dihydric phenol. The polymeric products will generally not be a single simple molecule but will be a complex mixture of glycidyl polyethers of the general formula

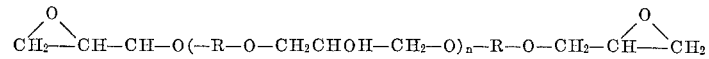

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarly zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

For detailed examples of examples of preparation of glycidyl polyethers of dihydric phenols, see U.S. Pat. 3,299,168 to Payne.

The compositions of the invention may be prepared by any suitable method. If both of the two components are liquids, the compositions may be simply prepared by mixing the two together. If the polyether polyepoxide is a thick liquid or solid, it is generally preferred to heat the hard material before or during the mixing. Various solvents or diluents which will evaporate before or during cure may be added to assist in the preparation, but the addition of these materials is not generally desirable as it usually lengthens the time of cure of the finished product. Suitable solvents include hydrocarbons, such as xylene, benzene, petroleum distillates and the like. Monoglycidyl compounds and nitrile may also be employed.

The ratio of the polyether polyepoxide and the bis(1,2-epoxyalkyl)cycloaliphatic hydrocarbon in the composition will vary within certain limits depending upon the properties desired in the resulting products. Compositions having desired properties are obtained when the bis(1,2-epoxyalkyl)cycloaliphatic hydrocarbon makes up at least 1% by weight of the mixture, and preferably 5% to 8% by weight of the mixture. Particularly good results are obtained when the bis(1,2-epoxyalkyl)cycloaliphatic hydrocarbon makes up fom 10% to 50% and the polyether polyepoxide makes up from 90% to 50% by weight of the combined mixture.

Other materials, such as fillers, dyes, plasticizers, stabilizers and the like may be added as desired along with suitable other resinous materials, such as vinyl resins, tars, pitches, distillates, oils, alkyd resins and the like.

The compositions of the invention may be cured by the action of a curing or hardening agent. For this purpose, epoxy curing agents, which may be acidic, neutral, or alkaline, are added. Examples of the curing agents include, among others, alkalies like sodium or potassium hydroxide; alkali phenoxides like sodium phenoxide; carboxylic acids or anhydrides, such as phthalic anhydride, tetrahydrophthalic anhydride; dimer or trimer acids derived from unsaturated fatty acids, 1,20-eicosanedioic acid, and the like. Friedel-Crafts metal halides, such as aluminum chloride, zinc chloride, ferric chloride; salts such as zinc fluoborate, magnesium perchlorate, zinc fluosilicate; phosphoric acid and partial esters thereof including n-butyl ortho-phosphate, diethyl ortho-phosphate and hexaethyltetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2-diaminomethylpropane, 2,3-diamino-2-2-methylbutane, 2,4-diamino-2-methylpentane, 2,4-diamine-2,6-diethyloctane, diethyloctane, dibutylamine, dioctylamine, dionylamine, distearylamine, diallylamine, dicyclohexylamine, methylethylamine, ethylcyclohexylamine, pyrrolidine, 2-methylpyrrolidine, tetrahydropyridine, 2,6 - diaminopyridine, metaphenylene diamine, and the like, and soluble adducts of amines and polyepoxides and their salts, such as described in U.S. 2,651,589 and in U.S. 2,640,037. Also included are the amino-amides obtained by reacting polybasic acids with polyamines.

Preferred curing agents are the polycarboxylic acids and their anhydrides, the primary and secondary aliphatic, cycloaliphatic, aromatic and heterocyclic amines, and preferably the polyamines and adducts of amines and epoxides.

The amount of the curing agent employed will vary depending upon the type of agent selected. In general, the amount of the curing agent will vary from about 0.5% to 200% by weight of the combined mixture of epoxy ether and bis(1,2-epoxyalkyl)cycloaliphatic hydrocarbon. The tertiary amines and $BF_3$ complexes are preferably employed in amounts varying from about 0.5% to 20% and the metal salts are preferably employed in amounts varying about 1% to 15%. The secondary and primary amines, acids and anhydrides are preferably employed in at least 0.6 equivalent, an equivalent amount being that sufficient to furnish one active hydrogen atom or carboxyl group or anhydride group for every epoxy group. Such combinations are preferably combined in equivalent ratios (curing agent to epoxy) which vary from about 0.6:1 to 1.5:1.

The curing of the above-described compositions to form the desired insoluble infusible products may be accomplished by merely mixing the above-noted curing agents in the desired amounts with the compositions of the present invention. The most active curing agents, such as the polyamines as diethylene triamine, are reactive at room temperature and application of heat is not necessary to effect the cure. Other agents, such as the aromatic polyamines are not quite as active at the lower temperatures and it is desirable to apply heat to speed cure. Temperatures employed will vary from about 30° C. to as high or higher than 250° C.

The compositions of the invention may be utilized for a variety of applications. Because of their excellent fluidity and improved properties, the compositions are ideally suited for use in preparing coating compositions, impregnating and sealing compositions, foams, pottings, castings adhesives and the like.

When used for coating compositions, the new compositions of the invention may be used as such or mixed with various additives, such as plasticizers, stabilizers and extenders such as oils, resins, tars, pitches, distillates and the like, and then combined with the desired curing agent. The coating prepared in this manner may be allowed to set hard at room temperature or heat may be applied to hasten the cure.

The products of the invention may also be used in preparing pottings and castings for electrical apparatus. In actual practice, the compositions are generally combined with the desired curing agent and the mixture poured into the mold or casting containing the electrical apparatus, such as electrical motors and the like, and the mixture allowed to set. Heat may also be applied to hasten cure.

The resinous products may also be employed to prepare valuable foamed products. In this application the resinous products of the invention are preferably combined with the desired curing agents and foaming agents and others, such as thixotropic agents, pigments, stabilizing agents and the like that may be desired. This mixture may be foamed and cured by allowing to stand or by applying heat.

The products of the invention may also be employed to employ valuable adhesives and impregnating compositions. In utilizing the products for these applications it is generally desirable to combine them with the desired curing agent and any suitable diluent such as acrylonitrile, acetonitrile, crotonitrile, and desired fillers and stabilizers and then apply this mixture to the desired surface. Adhesive compositions prepared in this manner may be used to unite various surfaces such as wood-to-wood, metal-to-metal, resins-to-resins and the like. The adhesives may be allowed to set at room temperature or heat may be applied to hasten the cure.

To illustrate the manner in which the invention may be carried out, the following examples are given. It is understood, however, that the examples are for the purpose of illustration and the invention is not to be regarded as limited to any of the specific conditions cited therein.

EXAMPLE I

Mixtures of Epon® Resin 828 [1] and divinylcyclopentane diepoxide (DVCPD) were made and viscosities measured. Table I reports the data found.

TABLE I

[Viscosity v. composition at 25° C. for mixtures of Epon ® Resin 828 and divinylcyclopentane diepoxide (DVCPD)]

| Composition 90, by weight | | |
|---|---|---|
| DVCPD | Epon 828 | Poise, 25° C. |
| 0 | 100 | 95 |
| 5 | 95 | 21 |
| 10 | 90 | 12 |
| 20 | 80 | 5 |
| 30 | 70 | 2 |
| 40 | 60 | 1 |
| 50 | 50 | 1 |
| 60 | 40 | 1 |
| 70 | 30 | <1 |
| 80 | 20 | <1 |
| 90 | 10 | <1 |
| 100 | 0 | <1 |

EXAMPLE II

Several of the mixtures produced in Example I were cured utilizing m-phenylenediamine in a cure cycle of 2 hours at 85° C. plus 6 hours at 160° C. Epon® Resin 828 was also mixed with a conventional diluent, butyl glycidyl ether and cured under identical conditions. Table II tabulates the data. As can be readily seen, the properties of heat distortion temperature (HDT) and flexural strength both improve as the amount of DVCPD used increases, contrary to what is found when conventional diluents are used. Furthermore, in comparing DCVDP to the conventional, diluent butyl glycidyl ether, the HDT and flexural strength are substantially higher in the examples using DVCPD.

TABLE II [1]

| | Viscosity, poise | HDT, ° C. | Flexural strength, p.s.i. | Modulus, p.s.i. | 1 day water pick up, percent |
|---|---|---|---|---|---|
| Epon ® resin 828 [2] | 95 | 152 | 20,940 | 4.74×10⁵ | 0.12 |
| Epon ® Resin 828, 88%, DVCPD, 12% | 10 | 170 | 21,650 | 4.52×15⁵ | 0.15 |
| Epon ® Resin 828, 80%, DVCPD, 20% | 5 | 176 | 22,080 | 4.52×10⁵ | 0.16 |
| Epon ® Resin 828, 90%, butyl glycidyl ether, 10% | 10 | 105 | 20,600 | 4.80×10⁵ | 0.24 |

[1] All percents are percent by weight.
[2] Epon ® Resin 828=glycidyl ether of 2,2-bis(4-hydroxyphenyl)propane having an average molecular weight of approximately 250 and an epoxide equivalent weight of 180-190, (polyether A).

NOTE:
HDT=heat distortion temperature
DVCPD=Divinylcyclopentane diepoxide

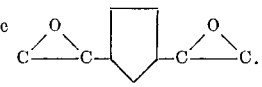

We claim as our invention:
1. A cured composition comprising the reaction product of a mixture of (1) a glycidyl polyether of a polyhydric phenol or a polyhydric alcohol, (2) at least 1% by weight of the mixture of a bis(1,2-epoxyalkyl)-cycloaliphatic compound having up to 3 carbon atoms in the epoxyalkyl group and 5 to 6 carbon atoms in the cycloaliphatic group and (3) 0.5% to 200% by weight of the mixture of (1) and (2) of an epoxy curing agent.

---
[1] Polyether A.—Glycidyl ether of 2,2-bis(4-hydroxyphenyl) propane having an average molecular weight of approximately 350 and an epoxide equivalent weight of 180-190.

2. A composition as in claim 1 wherein the polyepoxide is a glycidyl polyether of a dihydric phenol.

3. A composition as in claim 2 wherein the cycloaliphatic compound is divinylcyclopentane diepoxide.

4. A composition as in claim 2 wherein the dihydric phenol is 2,2-bis(4-hydroxyphenyl)propane.

5. A composition as in claim 1 having from 90 to 50% by weight of the mixture of polyether and 10 to 50% by weight of the mixture of cycloaliphatic compound.

6. A cured composition as in claim 1 wherein the curing agent is selected from the group consisting of polycarboxylic acid anhydrides and polyamines.

7. A cured composition as in claim 6 wherein the curing agent is m-phenylenediamine.

8. A cured composition as in claim 1 wherein the cycloaliphatic compound has the general formula

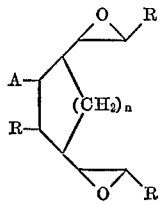

wherein R independently is hydrogen or methyl, $n$ is a whole number from 1 to 2, inclusive, and the A's taken singly are each hydrogen or taken together form a divalent oxy linkage which together with the adjacent carbon atoms to which said oxy linkage is attached forms an oxirane ring.

References Cited

UNITED STATES PATENTS

| | | | |
|---|---|---|---|
| 2,977,374 | 3/1961 | Phillips et al. | 260—2EP |
| 3,361,686 | 1/1968 | Tinsley et al. | 260—18EP |

OTHER REFERENCES

Chemical Abstracts, vol. 56, January 1962 (1357q).

Handbook of Epoxy Resins, Lee et al., July 1967 (pp. 13–9, 10, 12, 15, 16–18).

WILLIAM H. SHORT, Primary Examiner

T. E. PERTILLA, Assistant Examiner

U.S. Cl. X.R.

117—161; 161—184, 186; 260—2, 2.5, 28, 29.1, 47, 88.3, 835, 836